United States Patent
Williams

(10) Patent No.: US 8,833,398 B2
(45) Date of Patent: Sep. 16, 2014

(54) ENVIRONMENTALLY-FRIENDLY HOSE PLUG

(75) Inventor: James Williams, Staunton, VA (US)

(73) Assignee: Clean Planet Mfg. & Labs, Inc., Stanton, VA (US)

( * ) Notice: Subject to any disclaimer, the term of this patent is extended or adjusted under 35 U.S.C. 154(b) by 54 days.

(21) Appl. No.: 13/361,358

(22) Filed: Jan. 30, 2012

(65) Prior Publication Data

US 2012/0192980 A1     Aug. 2, 2012

Related U.S. Application Data

(60) Provisional application No. 61/437,657, filed on Jan. 30, 2011.

(51) Int. Cl.
*F16L 55/11*     (2006.01)
*B65D 39/00*     (2006.01)

(52) U.S. Cl.
CPC ............... *F16L 55/11* (2013.01); *Y10S 220/19* (2013.01)
USPC ............... 138/89; 138/90; 215/355; 215/296; 220/789; 220/801; 220/DIG. 19

(58) Field of Classification Search
USPC ........................ 138/89, 90; 215/302, 355, 296; 220/789, 801, DIG. 19
See application file for complete search history.

(56) References Cited

U.S. PATENT DOCUMENTS

| 729,835 | A | * | 6/1903 | Barnes et al. | 215/299 |
| 791,351 | A | * | 5/1905 | Arnold | 138/89 |
| 2,196,785 | A | * | 4/1940 | Takiguchi | 215/355 |
| 2,669,370 | A | * | 2/1954 | Royall, Jr | 215/355 |
| 2,746,632 | A | * | 5/1956 | Bramming | 215/270 |
| 2,921,708 | A | * | 1/1960 | Marcel | 215/230 |
| 3,200,984 | A | * | 8/1965 | Fueslein et al. | 220/240 |
| 3,471,179 | A | * | 10/1969 | Sixt | 285/148.22 |
| 3,574,312 | A | * | 4/1971 | Miller | 138/96 R |
| 3,578,027 | A | * | 5/1971 | Zopfi | 138/89 |
| 3,821,969 | A | * | 7/1974 | Sinko | 138/89 |
| 4,106,656 | A | * | 8/1978 | Babiol | 215/364 |
| 5,010,137 | A |   | 4/1991 | Umeda et al. | |
| 5,874,740 | A | * | 2/1999 | Ishiyama | 250/431 |
| 6,032,695 | A | * | 3/2000 | Wellen et al. | 138/89 |
| 6,453,925 | B1 | * | 9/2002 | Kamo | 137/2 |
| 6,688,336 | B2 | * | 2/2004 | Trichard | 138/89 |
| 7,290,804 | B2 |   | 11/2007 | Gehring et al. | |
| 7,490,629 | B2 | * | 2/2009 | Williams et al. | 138/89 |
| 7,562,910 | B2 |   | 7/2009 | Kertesz et al. | |
| 7,614,665 | B2 |   | 11/2009 | Hartmann | |
| 2009/0000686 | A1 | * | 1/2009 | Tsutsumi et al. | 138/141 |

* cited by examiner

*Primary Examiner* — Patrick F Brinson
(74) *Attorney, Agent, or Firm* — Fulbright & Jaworski LLP

(57) ABSTRACT

An environmentally-friendly hose plug may include an insertion section having a size selected for plugging a hose. The insertion section may be attached to a knob at a distal end of the hose plug through a gripping section. The gripping section provides a number of ridges to improve a technician's ability to handle the hose plug. The insertion section reduces the exertion of force by fluids in the hose against the hose plug. Thus, the hose plug is less likely to be forced from the hose by fluids in the hose. The insertion section may include one or more sealing rings for further reducing the leakage of fluids from the hose.

4 Claims, 5 Drawing Sheets

ENVIRONMENTALLY-FRIENDLY HOSE PLUG

CROSS-REFERENCE TO RELATED APPLICATIONS

This application claims priority to U.S. Provisional Patent Application No. 61/437,657 to Williams et al. filed on Jan. 30, 2011, and entitled "Enviro Hose Plug," which is hereby incorporated by reference in its entirety.

FIELD OF THE INVENTION

The instant disclosure relates to transportation and industrialized vehicles and apparatuses. The instant disclosure more specifically relates to preventing leakage of fluids from reservoir hoses in transportation and industrialized vehicles and apparatuses.

BACKGROUND

Motorized apparatuses, such as engines and generators, require frequent maintenance to obtain peak performance. The motorized apparatuses are often included in transportation and industrialized vehicles and apparatuses. Transportation vehicles may be cars, trucks, heavy trucks, motorcycles, boats, ships, and aircraft. Other industrialized vehicles and apparatuses may include fire trucks, air port tugs, hydraulic-powered underground capsules for mining, and other apparatuses used in agriculture, shipping, factory, and manufacturing.

These motorized apparatuses include multiple fluid reservoirs and hoses for passing liquid between different components in the apparatus. For example, automotive devices include radiators with a liquid reservoir for cooling components in the automotive device. As another example, automotive devices include fluid reservoirs for hydraulic systems, such as brakes, and hoses for moving liquid from the reservoir to components of the hydraulic system. When maintenance or repairs are performed on a motorized apparatus, the hoses are often disconnected leading to possible fluid loss from the reservoir and hosing. The fluid may drip or drain onto the ground causing environmental hazards and safety hazards.

Conventionally, spillage from the hoses is reduced by placing the loose end of the hose in a bucket or by inserting a multi-purpose plug to stop the draining and/or dripping. Because the conventional plugs are multi-purpose plugs, the conventional plugs are not designed specifically for retaining oils, fuels, and other fluids in their respective hoses. As a result, their effectiveness for preventing leakage is diminished. For example, the shape of the existing multipurpose plugs results in the plugs being expelled from the hose by pressure created from the draining fluids. When the plugs are dislodged from the hose, the fluids continue to exit the hose, increasing the threat of ecological damage and increasing human health risks. Further the draining creates a spill that must be cleaned up and dealt with in accordance with environmental regulations and expectations.

The conventional plugs also have a tendency to remain stuck in a hose if left for a long period of time. Because the conventional plug offers no grip to assist a technician, the technician may cut the hose above the plug to remove the plug. This procedure often leads to replacement of the hose, because the cut may result in a hose that is too short to fulfill its purpose. The conventional plug further has low durability and high cost.

Thus, there is a need for a hose plug that is reusable and capable of blocking fluid leakage to reduce environmental and safety hazards related to automotive components.

SUMMARY

Accordingly, it is an object of the present invention to provide a hose plug that locks into a hose to prevent fluid drips and drains from diesel, gas, engine oils, hydraulic and transmission oils, and filter fluids when the hose is disconnected from its respective reservoir.

Another object of the present invention is to provide a hose plug that is reusable and easily operated by a technician.

Hence, in order to achieve these objects and others and in accordance with one aspect of the present invention, there is provided a handheld plug for application to hoses for stopping fluid leakage. The plug may includes a tapered end for sealing a hose. The tapered end may include several sealing rings to reduce leakage of fluids. The plug may include a grip molded onto the plug to enable technicians to easily grab them and remove the plug from the hose. The plug may be constructed from a variety of materials, including, but not limited to plastic in varying grades, metal, glass, cork, and wood.

In accordance with another aspect of the present invention, there is provided a method for applying the plug to a hose to prevent leakage of fluids. The method includes the step of inserting the hose plug into the hose and securing the hose plug in the hose. The plug may be designed specifically for use with oil and fuel hoses. That is, the plug may be manufactured from materials resistant to the chemicals present in volatile compounds, such as oils and fuels. Further, a variety of sizes of hose plugs may be available. Thus, a technician may improve the sealing of a hose with the hose plug by selecting a hose plug of appropriate size for the hose.

According to one embodiment, a hose plug includes an insertion section. The hose plug also includes a knob at a distal end of the hose plug. The hose plug further includes a gripping section between the knob and the insertion section.

According to another embodiment, a hose plug includes means for plugging a hose. The hose plug also includes means for gripping the hose plug.

According to a further embodiment, a method includes loosening a hose end. The method also includes holding a gripping section of a hose plug. The method further includes inserting the hose plug into the hose end until at least one sealing ring of the hose plug is placed inside the hose end.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1A:
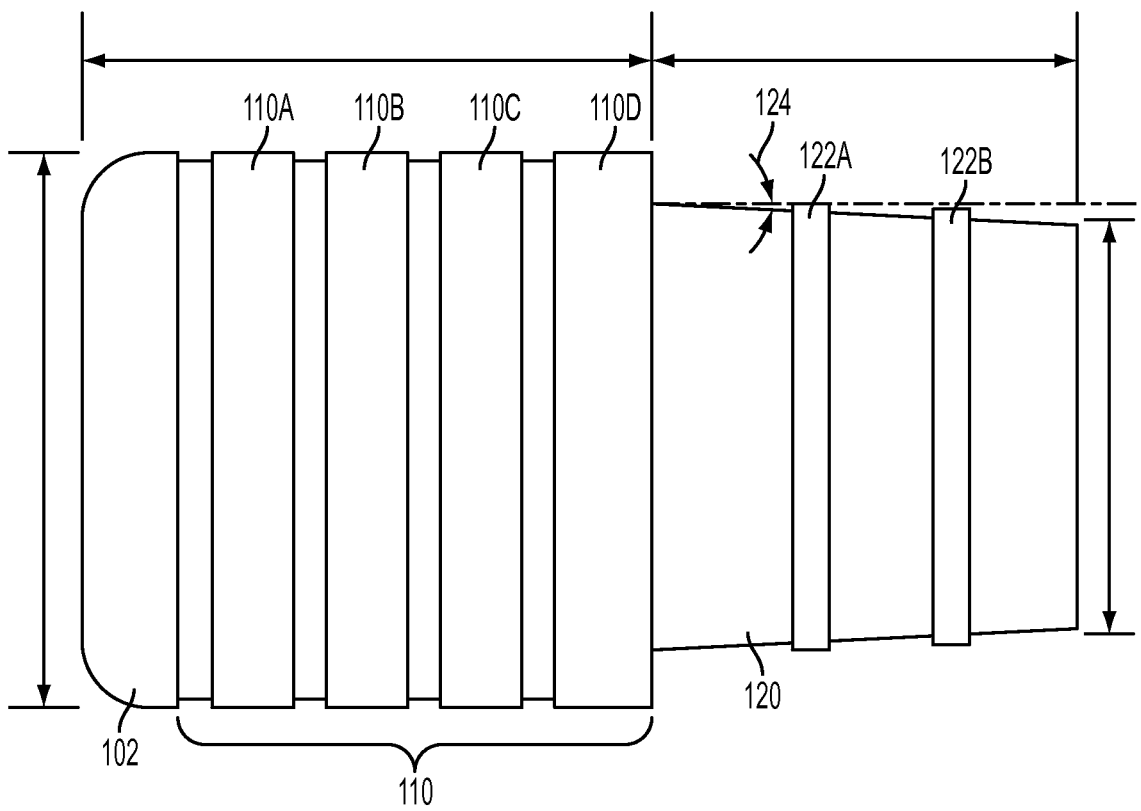
FIG. 1A is a cross-sectional view illustrating an environmentally-friendly hose plug with square angle sealing rings according to one aspect of the invention.

FIG. 1A is a cross-sectional view illustrating an environmentally-friendly hose plug according to one aspect of the invention. A hose plug 100 includes a knob 102 at a distal end from an insertion section 120 located at a hose-insertion end. The knob 102 may include identification information, such as printed text, a symbol, or a color marking. The identification information may inform a technician of the type or size of hose the hose plug 100 fits.

A gripping section 110 couples the knob 102 with the insertion section 120. The gripping section 110 may include one or more enlarged cylindrical rings 110a-d. The rings 110a-d may create a ribbed region within the gripping section 110, which improves a technicians grip on the hose plug 100. According to another embodiment, the gripping section 110 may include a number of smaller cylindrical protrusions extending from the hose plug 100 creating a dot pattern offering improved grip in the gripping section 110.

According to one embodiment, the hose plug 110 may be constructed in a single mold from plastic in varying grades, metal, glass, cork, and/or wood. According to another embodiment, different portions of the hose plug 110 may be manufactured from different materials and connected together through an assembly process including screwing, nailing, and/or adhering sections together. For example, the knob 102 may be constructed from wood, the insertion section 120 may be manufactured from a plastic highly resistant to chemicals, and the gripping section 110 may be constructed from rubber.

The insertion section 120 may be tapered to allow for securely fitting the hose plug 100 to a hose (not shown) and to prevent fluid in the hose from creating a force on the plug 100 pushing the plug 100 out of the hose. The taper of the insertion section 120 forms an angle 124 with a longitudinal axis running the length of the insertion section 120. The angle 124 may be between 0 and 45 degrees. According to one embodiment, the angle 124 may vary based on the size of the hose plug 100.

The insertion section 120 may include one or more sealing rings 122a-b. The sealing rings 122a-b may further improve the capability of the hose plug 100 to reduce fluid leakage from a hose. According to one embodiment, the rings 122a-b may have a diameter similar to that of the widest portion of the insertion section 120. The diameter may be measured from the longitudinal axis running the length of the insertion section 120. The sealing rings 122a may grip the inside of a hose to hold the plug 100 in place. According to another embodiment, each of the rings 122a-b may have a progressively smaller diameter, such that the ring 122b has a smaller diameter than the ring 122a. The sealing rings 122a-b may be separate rings attached to the insertions section 120, such as o-rings, or the sealing rings 122a-b may be part of a mold used to manufacture the insertion section 120, such that the sealing rings 122a-b are integrated with the insertion section 120.

Figure 1B:
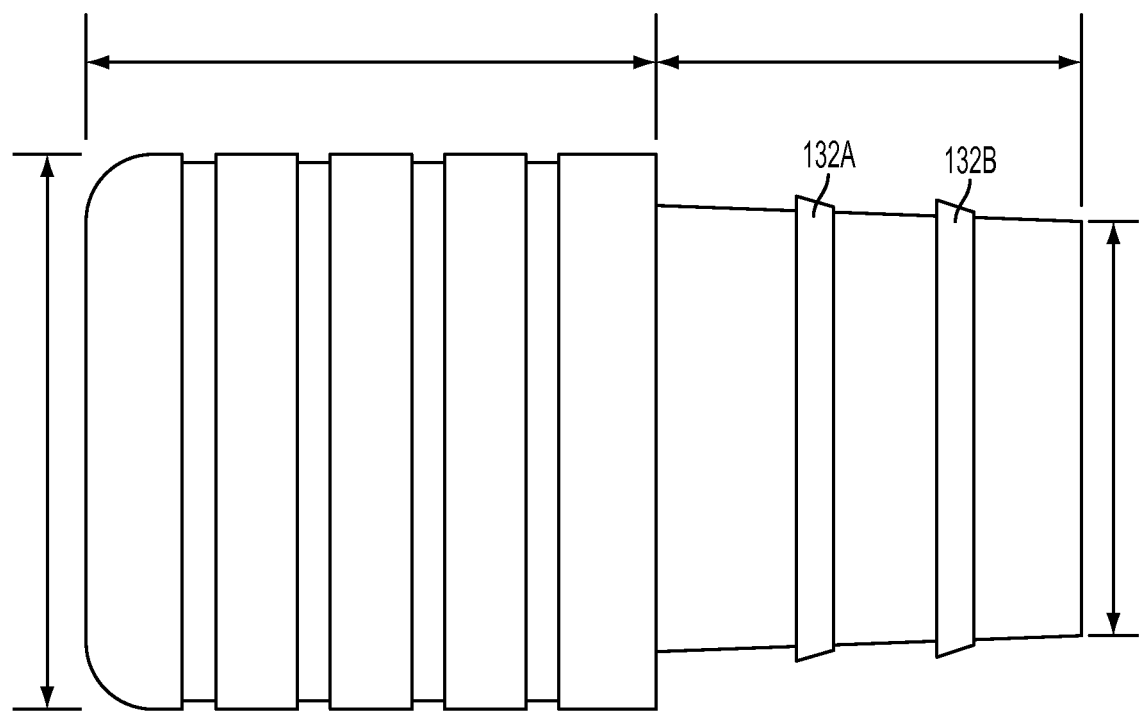
FIG. 1B is a cross-sectional view illustrating an environmentally-friendly hose plug with angle sealing rings according to one aspect of the invention.
Figure 1C:
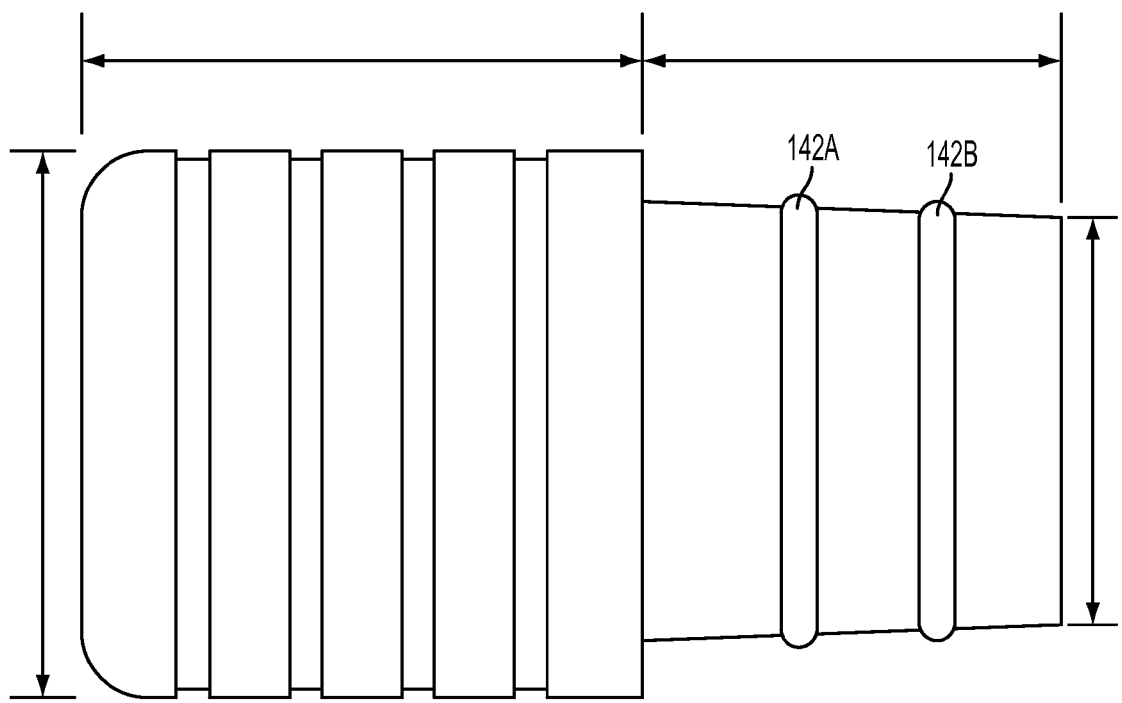
FIG. 1C is a cross-sectional view illustrating an environmentally-friendly hose plug with rounded sealing rings according to one aspect of the invention.

The sealing rings 122a-b illustrated in FIG. 1A have a square angle. The square angle sealing rings of FIG. 1A may be used in hoses made of soft rubber compounds. The square angle may provide a secure grip on soft rubber compounds. The sealing rings 122a-b may be shaped differently for different types of hoses. For example, sealing rings 132a-b illustrated in FIG. 1B have a 45 degree angle sealing ring. The angled sealing rings 132a-b may be used in hoses made of hard rubber compounds. The 45 degree angle may allow the sealing rings 132a-b to bite into hard rubber hoses to obtain better grip and sealing with the hose. In another example, sealing rings 142a-b illustrated in FIG. 1C have a rounded sealing ring. The rounded sealing rings 142a-b may be used in hoses made of hard plastic, metal, or other hard materials.

Referring back to FIG. 1A, the insertion section 120 may be manufactured to different sizes to correspond with different size hoses. For example, the insertion section 120 may be manufactured having a largest diameter of between approximately 0.25 inches and approximately five inches in sixteenth of an inch increments. The insertion section 120 may also be manufactured in metric sizes, such as in sizes between 10 millimeters and 120 millimeters in ten millimeter increments. The angle 124 may vary for different size insertion sections 120. For example, when a diameter of the insertion section 120 is one quarter of an inch, five sixteenths of an inch, or three eights of an inch, the angle 124 may be 8 degrees. In another example, when a diameter of the insertion section 120 is one half of an inch, five eighths of an inch, or three quarters of an inch, the angle 124 may be 5.344 degrees. In yet another example, when a diameter of the insertion section 120 is one inch, the angle 124 may be 7.6 degrees.

Figure 2:
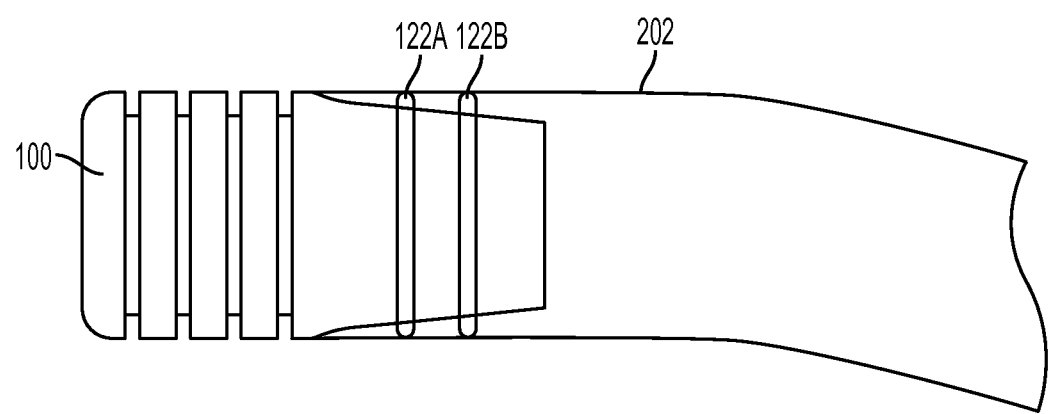
FIG. 2 is a block diagram illustrating the environmentally-friendly hose plug inserted in a hose according to one aspect of the invention.

FIG. 2 is a block diagram illustrating the environmentally-friendly hose plug inserted in a hose according to one aspect of the invention. A technician may operate the hose plug 100 by inserting and extracting the plug 100 by holding the gripping section 110. Tapering of the insertion section 120 may improve the fit of the hose plug 100 into a hose 202 and to reduce force exerted on the plug 100 by fluid (not shown) in the hose 202. Two sealing rings 122a-b may further reduce the likelihood of the plug accidentally being forced out of the hose 202.

Figure 3:
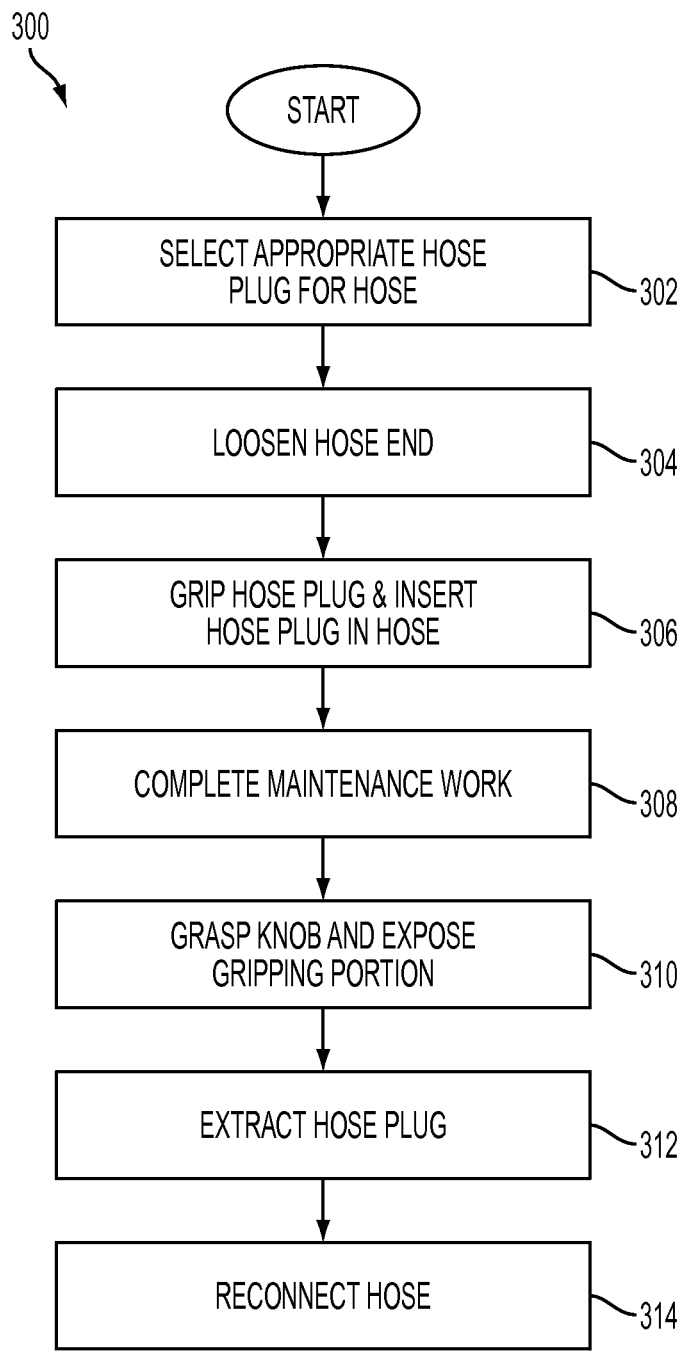
FIG. 3 is a flow chart illustrating a method for using the hose plug during maintenance according to one aspect of the invention.

FIG. 3 is a flow chart illustrating a method for using the hose plug during maintenance according to one aspect of the invention. A method 300 begins at block 302 with a technician selecting an appropriate size plug for plugging a hose. At block 304, the technician loosens the hose end from a reservoir. At block 306, a technician grips the hose plug 100 by the gripping section 110 and inserts the selected hose plug into the hose. The plug may be inserted into the hose until at least one of the sealing rings 122a-b seals the hose. According to one embodiment, the technician may insert the plug until all of the sealing rings 122a-b are inserted in the hose. The technician may further apply force to the knob 102 to snap the hose plug 100 into the hose, such that the gripping section 110 is inserted into the hose. The hose plug holds fluid in the hose and reduces dripping or draining of fluids from the hose. Upon completion of the repair or maintenance work at block 308, the technician may grasp the knob 102 and pull the hose plug 100 to expose the gripping section 110 at block 310. At block 312, the technician may extract the remainder of the hose plug 100 from the hose, and at block 314, reconnect the hose to its respective fluid reservoir or engine component.

The hose plug described above reduces leakage of oil, fuels, antifreeze, coolants, hydraulic fluids, and other fluids from draining from a disconnected hose during maintenance and repair services. The reduced fluid leakage reduces environmental hazards by reducing the amount of chemicals being disposed. The reduced fluid leakage also reduces safety hazards by reducing the likelihood of a slip-and-fall accident in a workplace.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although a hose plug for motorized apparatuses is described, the hose plug may also be useful in other applications, such as agriculture and heavy equipment, ships, pleasure craft, mining equipment, airport ground support equipment, and garden hoses. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hose plug, comprising:
   an insertion section comprising a plurality of sealing rings attached to the insertion section, wherein the insertion section is configured to be removable without altering the hose, in which the insertion section comprises a plastic resistant to chemicals, and in which the sealing rings comprise approximately a 45 degree angle sealing ring;
   a knob at a distal end of the hose plug, in which the knob comprises wood, and in which the knob is closed to seal fluid in the hose; and
   a gripping section between the knob and the insertion section, in which the gripping section comprises rubber.

2. The hose plug of claim 1, in which the insertion section is tapered with an angle between approximately zero degrees and approximately ten degrees.

3. The hose plug of claim 1, in which one of the at least one sealing ring has a diameter approximately equal to a diameter of the insertion section at an end of the insertion section nearest to the distal end.

4. The hose plug of claim 1, in which the gripping section comprises a plurality of rings forming a ribbed region.

\* \* \* \* \*